(12) United States Patent
Sellen et al.

(10) Patent No.: US 7,290,715 B2
(45) Date of Patent: Nov. 6, 2007

(54) PHYSICAL MULTIMEDIA DOCUMENTS, AND METHODS AND APPARATUS FOR PUBLISHING AND READING THEM

(75) Inventors: Abigail Jane Sellen, Newbury (GB); John Deryk Waters, Bath (GB); Guy de Warrenne Bruce Adams, Stroud Gloucestershire (GB); Richard Anthony Lawrence, S. Glos (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 10/697,250

(22) Filed: Oct. 31, 2003

(65) Prior Publication Data

US 2004/0230887 A1 Nov. 18, 2004

(30) Foreign Application Priority Data

Jan. 15, 2003 (GB) ................................ 0300907.3

(51) Int. Cl.
*G06K 19/06* (2006.01)
(52) U.S. Cl. ...................................... 235/492; 235/487
(58) Field of Classification Search ................ 235/492, 235/487
See application file for complete search history.

(56) References Cited

U.S. PATENT DOCUMENTS 5,905,798 A * 5/1999 Nerlikar et al. ............... 705/57
6,198,875 B1 * 3/2001 Edenson et al. .............. 386/94
6,585,154 B1 * 7/2003 Ostrover et al. ............ 235/375
6,827,279 B2 * 12/2004 Teraura ...................... 235/492
2002/0170973 A1 11/2002 Teraura

FOREIGN PATENT DOCUMENTS

WO 00/03298 A1 1/2000
WO 01/91045 A1 11/2001

* cited by examiner

*Primary Examiner*—Lisa Caputo

(57) ABSTRACT

A published document comprises a printed document and at least one memory attached to the printed document, wherein said at least one memory comprises an electrical circuit without an integral power source but may be powered wirelessly so that it may transmit information wirelessly, wherein at least a portion of the information stored in the published document for display to the user is provided in said at least one memory. A method of viewing information in such a published document comprises viewing information printed in the printed document, powering the memory circuit with a reader device to transmit information stored in the memory circuit to the reader device wirelessly, and displaying the information stored in the memory circuit by means of the reader device for viewing by the user. An appropriate reader device and method for publishing the document are described.

24 Claims, 7 Drawing Sheets

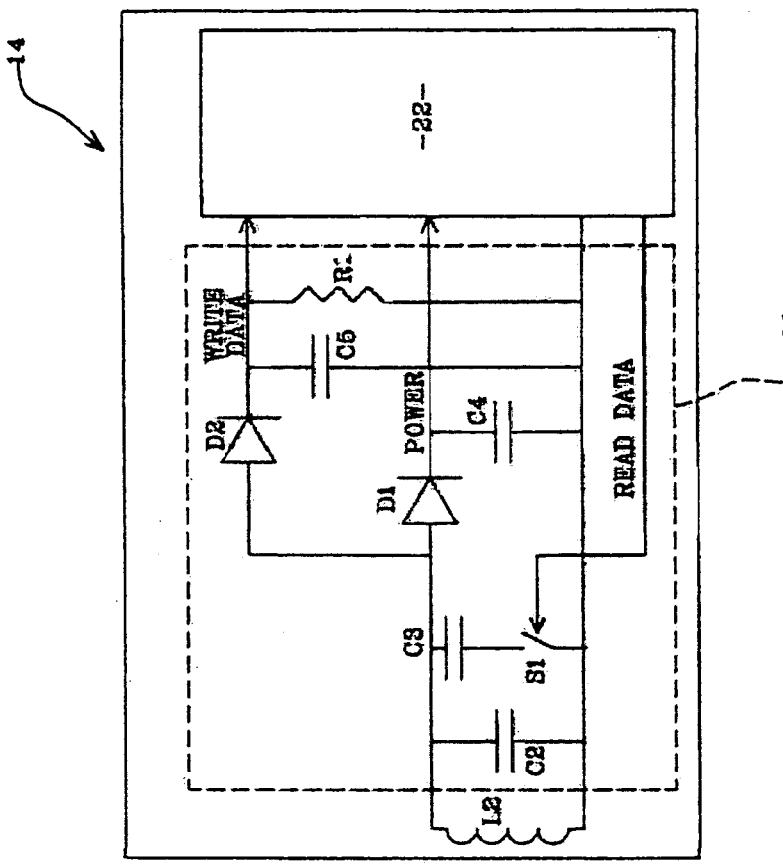
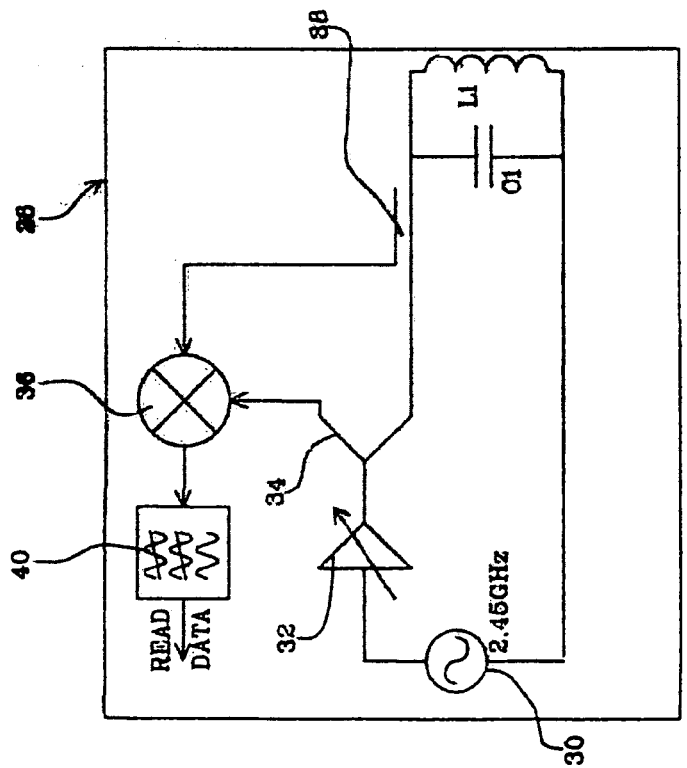
FIG 3

PHYSICAL MULTIMEDIA DOCUMENTS, AND METHODS AND APPARATUS FOR PUBLISHING AND READING THEM

FIELD OF THE INVENTION

The invention relates to physical multimedia documents: that is, documents which are physical objects which contain information in two different forms of media. More specifically, the invention relates to documents which comprise both a printed document and information stored in a memory circuit.

BACKGROUND TO THE INVENTION

Multimedia documents are typically considered to be digital rather than physical objects—typically, they are provided on a digital media carrier (such as a DVD) or downloaded from the public internet, and then rendered or otherwise executed as data in a plurality of data formats (for example, an html document comprising within it text, audio in an audio format, images in an image format, or video in a video format). Such documents are typically for display on a PC.

It is known (see the applicant's earlier International Patent Application Publication No. 00/03298) to provide a copy of an image on a chip attached to a printed copy of the image as a way to recover the image if the printed copy is damaged. It is also known (see WO 00/03298 and the art discussed therein) to annotate still images with sound. Some books have pockets holding CDs or DVDs containing ancillary material to be played on a CD or DVD player, or a PC. US Patent Application No. 2002/0170973 describes enhancement of printing paper with RFID chips adapted to provide copy control information.

It is generally appreciated that a physical book or magazine is a far more satisfactory form factor for a user to view data (in particular text) than the screen of a PC. It is therefore desirable to preserve this as a form factor for viewing text at least, but also to attempt to achieve the flexibility of data provision achievable with a digital multimedia document.

SUMMARY OF THE INVENTION

In a first aspect, the invention provides a published document comprising a printed document and at least one memory attached to the printed document, wherein said at least one memory comprises an electrical circuit without an integral power source but may be powered wirelessly so that it may transmit information wirelessly, wherein at least a portion of the information stored in the published document for display to the user is provided in said at least one memory.

Conventional printed documents can therefore be enhanced by information (at least some of which is visual in character) relating to the information displayed in the printed document. This information will generally be provided by the publisher of the printed document (though in some embodiments the possibility exists for personalisation by adding some or all of this information at a later point).

Application of embodiments of the invention allows for a new kind of multimedia document—rather than being purely electronic, the document retains the clear advantages of the paper form factor for most visual information, but allows for other visual information to be provided by a highly user accessable interface. This additional visual information may be, for example, video, or may be personalised to a greater or a lesser degree (with the personalisation information either added to the document, or else residing within a reader device for reading the memory).

In a second aspect, the invention provides a reader device for reading information from an unpowered memory circuit attached to a printed document, the reader device comprising: a circuit for providing power to the memory circuit so that data can be transmitted from a memory of the memory circuit; a decoder to read information transmitted by a transmitter of the memory circuit; and a display circuit for providing information received by the decoder for display.

In a third aspect, the invention provides a system for viewing published information, comprising a published document as described above and a reader device as described above.

In a fourth aspect, the invention provides a method of viewing information in a published document comprising a printed document and one or more memory circuits attached to the printed document, the method comprising: viewing information printed in the printed document; powering the memory circuit with a reader device to transmit information stored in the memory circuit to the reader device wirelessly; and displaying the information stored in the memory circuit by means of the reader device for viewing by the user.

In a fifth aspect, the invention provides a method of publishing a document, comprising: determining first information for viewing by a user to be printed in a printed document and second information for viewing by a user to be written to one or more memory circuits attached to the printed document; printing the first information on a print medium to form the printed document; and writing the second information into the one or more memory circuits attached to the printed document, wherein the one or more memory circuits are adapted to be powered and read wirelessly by a reader device so that the second information can be viewed by a user.

DESCRIPTION OF DRAWINGS

Specific embodiments of the invention will now be described, by way of example, with reference to the accompanying drawings, of which:

FIG. 3 illustrates the circuitry of the memory tag of FIG. 2 and of a read/write device for wireless communication with the memory tag;

DESCRIPTION OF SPECIFIC EMBODIMENTS

There will first be described, with reference to FIGS. 1 to 3, a particularly suitable technology for use according to embodiments of the invention by which memory circuits can be attached to or incorporated within printed documents. The memory circuits described, referred to as memory tags, are a form of inductively powered circuit read and written by radio-frequency communication—as such they resemble the existing RFID tag—but it will be appreciated by the skilled person that alternative forms of memory circuit may also be employable for the purpose described. There will then be described, with reference to FIGS. 4 to 6, an exemplary method of printing documents whose published content for viewing is divided between a printed document and one or more memory circuits attached to or incorporated within printed documents—the publishing of such documents will also be discussed. There will then be described, with reference to FIG. 7, an exemplary approach to reading such published documents.

Figure 1:
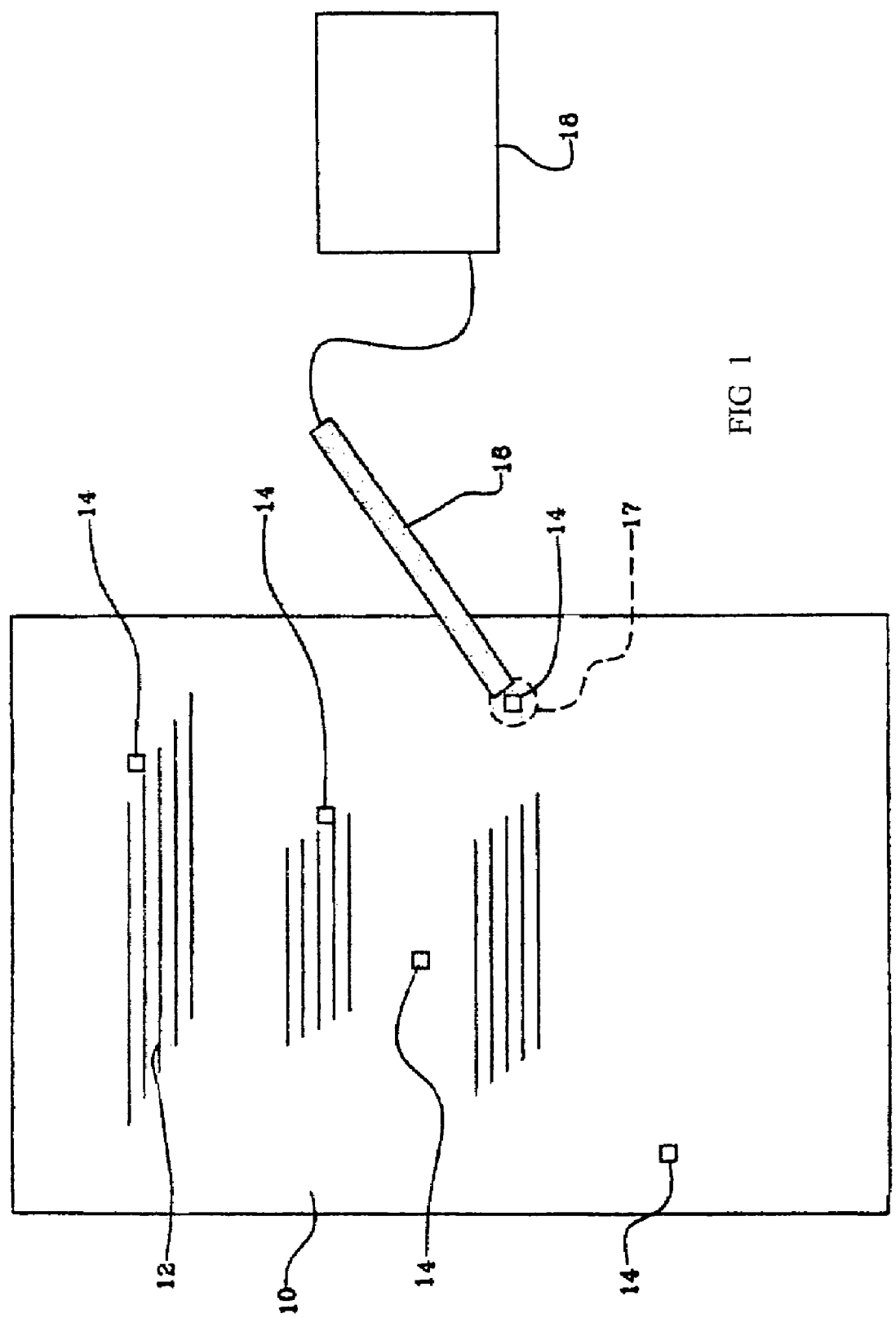
FIG. 1 illustrates a sheet of paper annotated with electronic data in a manner illustrative of an embodiment of the invention.

FIG. 1 illustrates an item, in this case a sheet of paper 10, bearing printing 12, which has been annotated with electronic data using a plurality of memory tags 14. The memory tags 14 have been secured to the sheet of paper 10 at various locations over its surface, although they may alternatively be embedded in the paper sheet 10, preferably in locations identified by the printing 12, in order to assist in locating them for the purposes of reading data from or writing data to the memory tags 14.

A hand held read/write device 16 is used to communicate with the memory tags 14 in wireless manner, as will be discussed further below. The read/write device 16 is also connected to a host computer, display, data rendering device or other apparatus 18 from which the data for writing to the memory tags 14 is received, and/or the data read from the memory tags 14 is passed.

Figure 2:
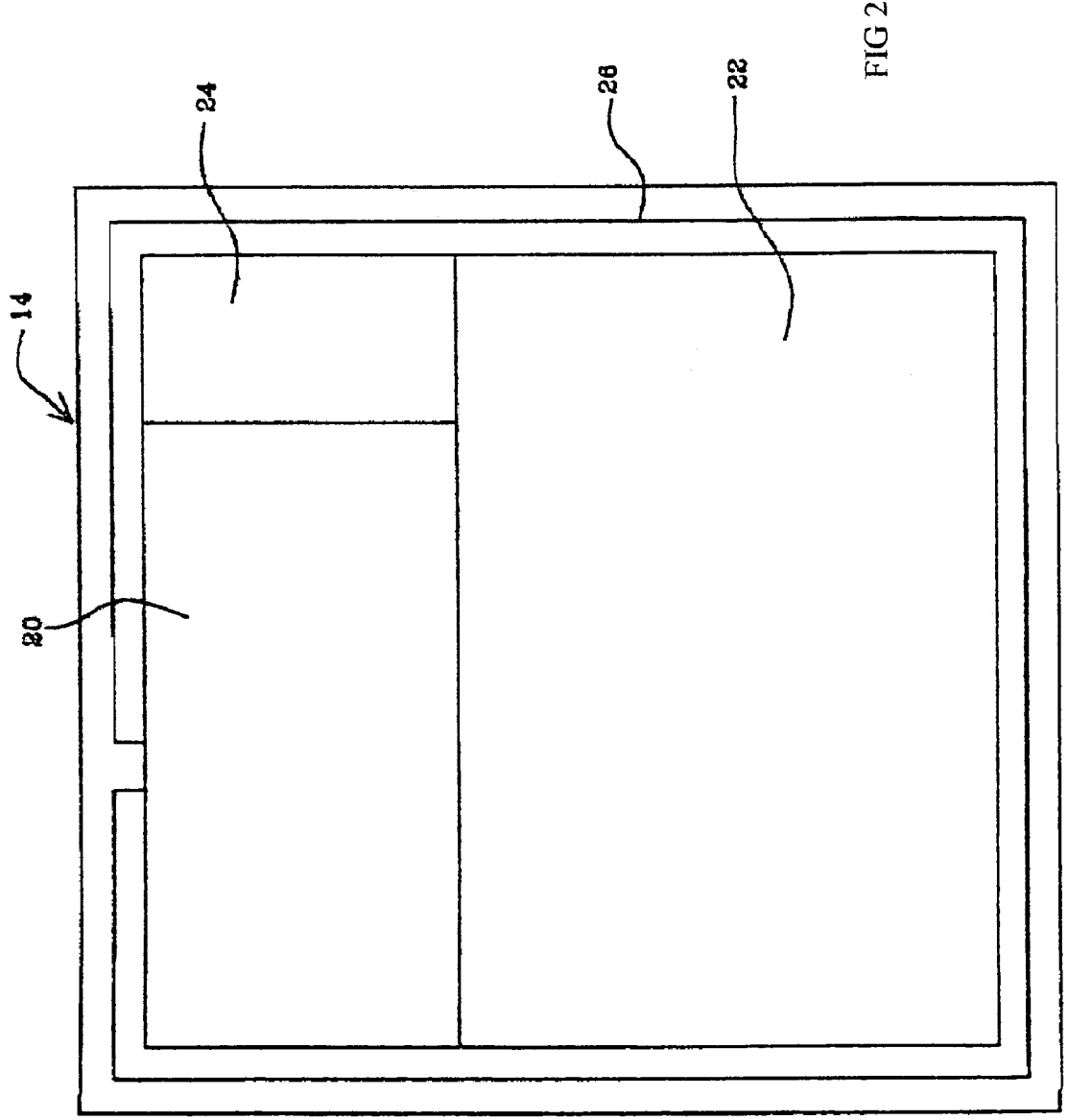
FIG. 2 illustrates an RFID memory tag sutiable for use in the embodiments of the invention.

Referring now to FIG. 2, a schematic of a memory tag 14 is shown. The memory tag 14 is an RFID memory tag provided on a chip, and comprises an RFID transponder circuit 20, a memory 22, a power supply capacitor 24 and an antenna coil 26 having only a few turns e.g. five, or as in this case a single turn. The RFID transponder circuit 20 operates at 2.45 GHz, is of an area of approximately 0.5 mm$^2$, and will be described further below. The memory 22 provides 1 Mbit of capacity of non-volatile memory and is of an area of approximately 1 mm$^2$, and uses FRAM (ferroelectric random access memory) or MRAM (magnetoresistive random access memory) or similar memory technology requiring low power. The memory tags 14 are of a substantially square shape in plan view with an external dimension D for their sides of around 1 mm.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The RFID transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read/write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 28 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the read/write device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and read/write device 16 described above power transfer of around 25% can be achieved with a distance of around 1.8 mm between the antennae L1 and L2, of the read/write device 16 and memory tag 14 respectively. This is sufficient to transfer enough power to the memory tag 14 for it to operate.

The memory tags 14 have an external dimension D of around 1 mm, as described above, and therefore the read/write device 16 can communicate with them over a relatively short range, in this example of approximately 2D, (as illustrated on FIG. 1 by broken circle 17). However, the distance over which the read/write device 16 and memory tag 14 will communicate effectively will clearly vary with the exact details of their construction, and it may therefore be up to 10D. Distances greater than this would limit the ability to use a plurality of memory tags 14 on a single sheet of paper 10, or other item, due to the distances which would be necessary between the memory tags 14 to ensure that the read/write device 16 does communicate with the desired memory tag 14 out of a number present. To ensure that communication is with the correct memory tag 14 in every circumstance a communication distance of 5D or less is preferable.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although the memory tags 14 described above operate at 2.45 GHz it should be understood that memory tags operating at other frequencies may be used to implement the invention. Factors affacting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

It should further be appreciated that memory tags of this functional type can be produced without using RFID technology. For example, optical technologies can be used to power, read and write to memory tags, as described in the applicant's earlier British Patent Application No. 0227152.6.

Figure 4:
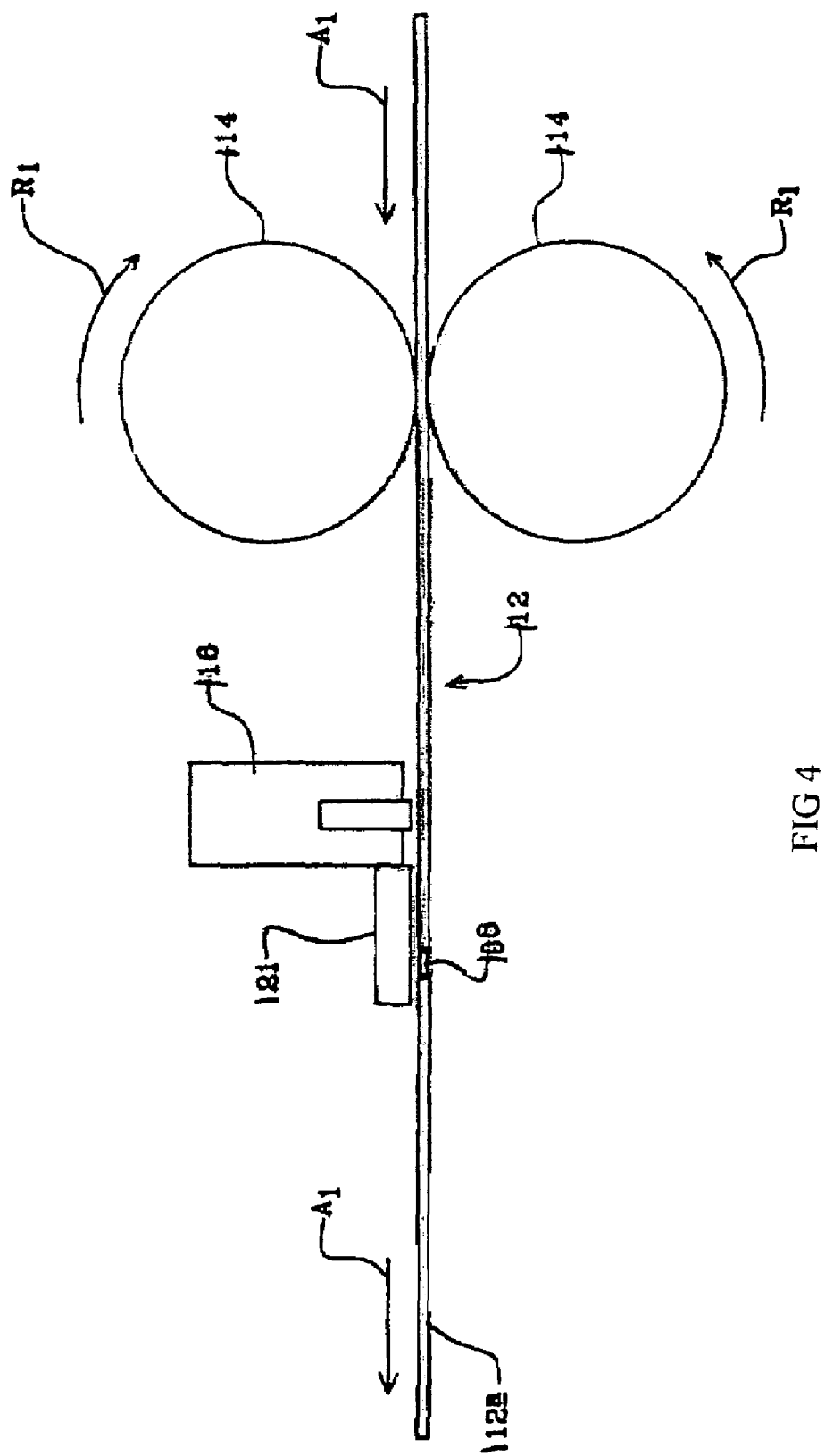
FIG. 4 is a schematic of the main elements of a printing device suitable for executing a method according to embodiments of the invention from the side.
Figure 5:
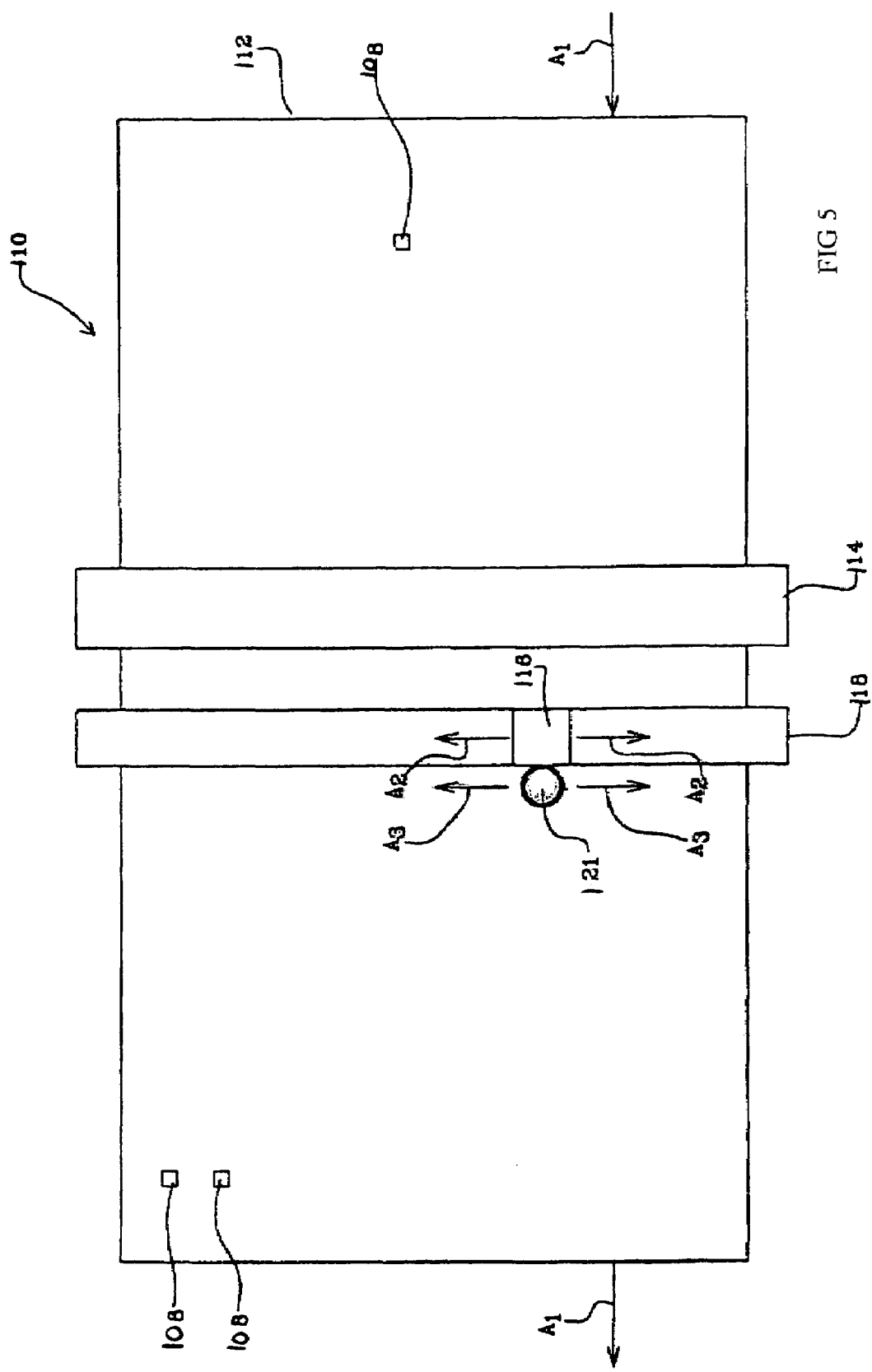
FIG. 5 is a schematic of the apparatus of FIG. 4 from above.

Referring to FIGS. 4 and 5, apparatus 110 for printing onto a base medium and data writing to a memory tag in or on the base medium is illustrated. This embodiment is for use with a base medium in the form of sheet paper 112, to which memory tags 108 have been applied or within which memory tags 108 have been embedded (as shown in FIG. 4). The memory tags 108 are RFID memory tags for which the manner of writing data to the tags and reading data from the tags is well known (see above, but in addition for example the RFID Handbook, Klaus Finkenzeller, 1999, John Wiley & Sons). For simplicity only those parts of the apparatus 110 which need to be shown to describe the invention are illustrated and described. It will be understood that the apparatus 110 includes much known technology from the prior art of printers, and from the prior art of RFID memory tags, which is not described here.

The apparatus 110 includes paper feed rollers 114 which are driven to rotate as indicated by arrows R1 to feed the paper sheets 112 through the apparatus 110 along a first axis in the direction indicated by arrows A1.

The apparatus 110 further includes a print head 116, which in this example is of ink jet form, mounted on a print head carriage 118 which extends across the apparatus 110 substantially perpendicular to the axis A1. The print head 116 is moveable back and forth along the print head carriage 118, in known manner. Thus the print head 116 is moveable back and forth along a second axis indicated by arrows A2, substantially perpendicular to the axis A1, to enable the print head 116 to access most of the upper surface 112a of the paper sheet 112 as it moves through the apparatus 110, and thus to print anywhere on that accessible area of surface 112a as required.

The apparatus 110 also includes a memory tag read/write device 120 which operates in known manner to write data to and/or read data from memory tags as required using an inductive coil 121. The inductive coil 121 of the memory tag read/write device 120 is connected to the print head 116 for movement back and forth along the print head carriage 118 with the print head 116. Thus the inductive coil 121 is moveable back and forth along a third axis indicated by arrows A3, substantially perpendicular to the axis A1, and parallel to the axis A2, to enable the memory tag read/write device 120 to read data from and/or write data to memory tags 108 located anywhere on or in the accessible area of the paper sheet 112, as will be described further below.

Figure 6:
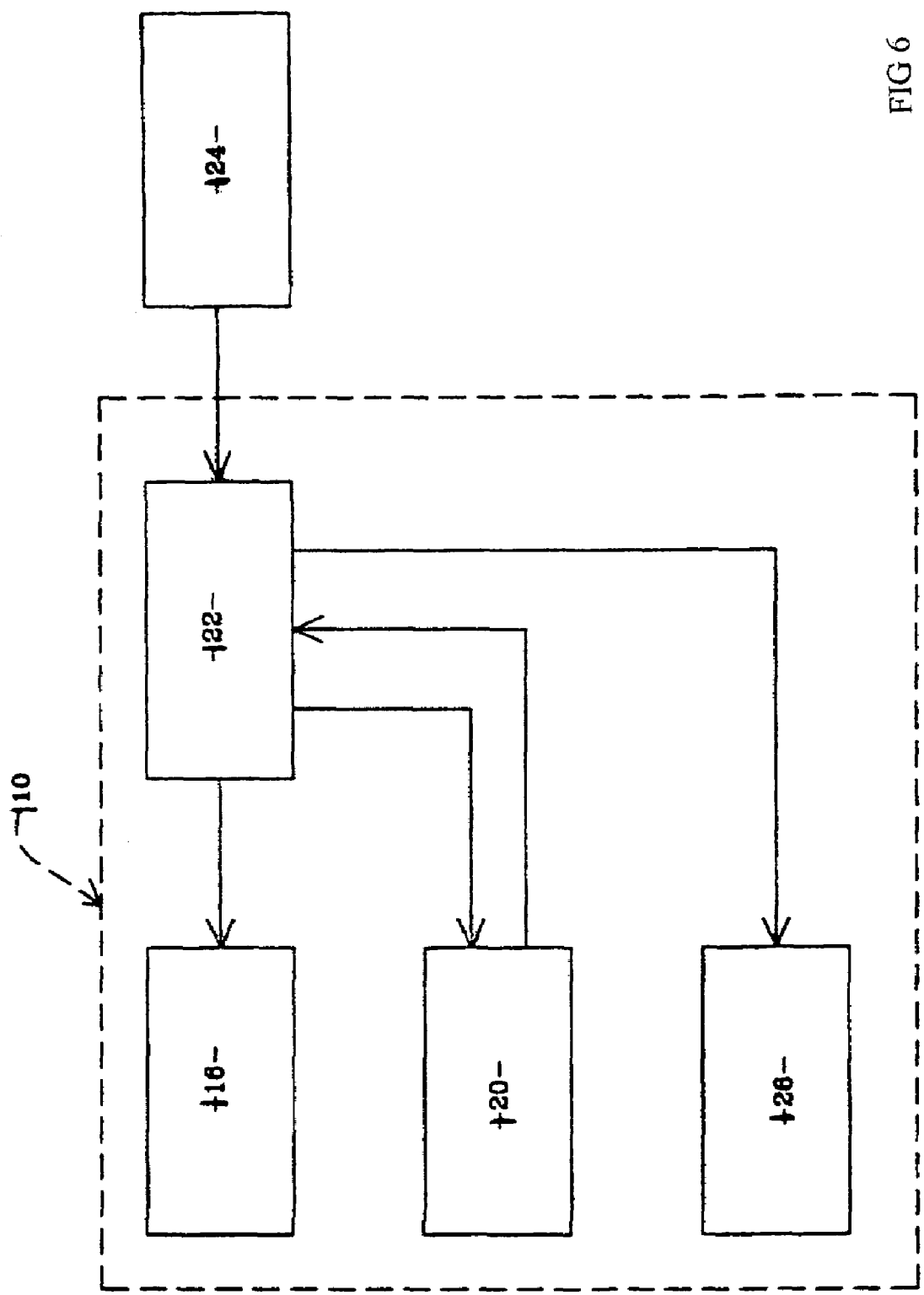
FIG. 6 is a block diagram of the control of the apparatus of FIGS. 4 and 5.

Referring now also to FIG. 6, the apparatus 110 also includes a main processor 122 and a mechanics controller 126, which controls all the mechanical operations of the apparatus 110, (i.e. the paper feed rollers 114, the movement of the print head 116 and inductive coil 121 along the print head carriage 118). The main processor 122 receives instruction signals from a host computer 124, including the details of:

what to print;
where to print it;
where the memory tag 108 is or tags 108 are in/on the paper sheet 112; and
what data to write to the memory tag(s) 108.

The main processor 122 sends command signals as required to:

the mechanics controller;
the print head 116; and
the memory tag read/write device 120, to implement the instruction signals.

Thus the paper sheet 112 is fed through the apparatus 110 and has the required information printed on its upper surface 112a. At the same time the memory tags 108 on or within the paper sheet 112 have the necessary data written to them by the memory tag read/write device 120, with the movement of the memory tag read/write device 120 (and print head 116) being paused with the memory tag read/write device 120 over the or each memory tag 108 as necessary for the data writing to take place.

The manner of co-ordination of the printing and data writing processes will depend on a number of factors. If, for example, the memory tags 108 are only present adjacent the top and/or bottom of the paper sheet 112 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 112.

In embodiments of the invention, the memory tags 108 will typically be read by hand held readers. Thus in order to assist users in the future to locate the memory tags 108 on the paper sheet 112 the memory tags 108 may have icons printed over their locations which can be readily identified by users.

The memory tag read/write device 120 may, in addition to writing the data to the memory tags 108, also conduct a read operation to check that the data has written successfully before the paper sheet 112 is moved on following the data write operation. Alternatively, particularly if the apparatus 110 is operating at high speed, a separate data check device (not shown) may be included in the apparatus such that this operation takes place downstream of a memory tag write device which in this case need not also be capable of data reading.

It will be readily appreciated by the person skilled in the art that the modification to a conventional printing technology (in this case, the functional structure of the printing device is that customarily found in inkjet printing technology) can be employed to functional structures used in other printing technologies, such as laserjet and digital presses (such as HP Indigo presses). This last technology is particularly suitable for mass production of documents, for example book publication.

It can be seen from the above that there is no fundamental complexity involved in creating and publishing documents in accordance with embodiments of the invention using printing technology described in FIGS. 4 to 6. As for the content generation stage, conventional word processing and web publishing software (such as Microsoft Word and Microsoft Frontpage respectively) familiarly allows inserts of data of a different data type—in web publishing in particular, it is familiar to determine an icon for rendering that has a hyperlink function and can serve, if activated by a reader of the document, to link to another page or a file (such as a sound clip). Essentially the same approach can be taken here—the user composing the document on host computer 124 can place an icon on the page being composed (the possibilities for doing this may be determined by the approach taken to including memory tags with the printed document—if they are fixed in the paper, then the icon may either be constrained to sit with an available tag, or may instead be an indicator of which of a row or column of tags is to be read at a given point, whereas if the tags are to be placed by the printer, the icon may be at any point on the page), and may designate a particular file to be stored in the memory tag associated with that icon. The document for printing, the files for the memory tags, and all placement information can then be provided by the document generation software on host computer 124 to the main processor 122 of the printing device for rendering as described above.

It can therefore be seen that a method of publishing a document, according to an aspect of the invention can comprise determining first information for viewing by a user to be printed in a printed document and second information for viewing by a user to be written to one or more memory circuits attached to the printed document, printing the first information on a print medium to form the printed document; and writing the second information into the one or more memory circuits attached to the printed document, wherein the one or more memory circuits are adapted to be powered and read wirelessly by a reader device so that the second information can be viewed by a user.

Figure 7:
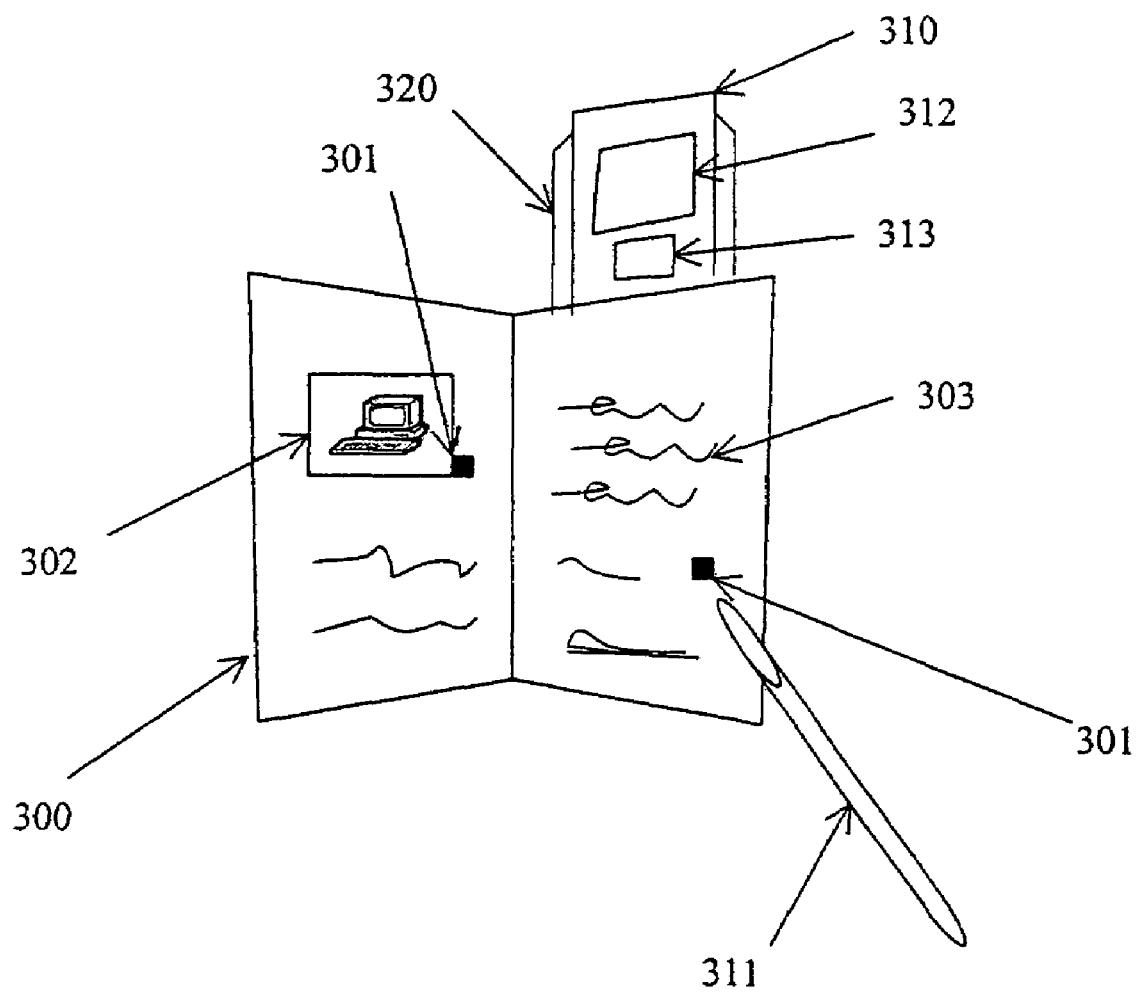
FIG. 7 illustrates a system for viewing information in accordance with embodiments of the invention in use.

FIG. 7 shows a preferred way in which a user can view a published document of the type according to an embodiment of the invention, the published document using the memory tag and printing technologies described above with reference to FIGS. 1 to 6.

FIG. 7 shows a published document comprising a printed document and at least one memory (in the form of a memory tag) attached to the printed document, wherein said at least one memory comprises an electrical circuit without an integral power source but may be powered wirelessly so that it may transmit information wirelessly, wherein at least a portion of the information stored in the published document for display to the user is provided in said at least one memory.

A book 300 is provided with memory tags 301 essentially as shown in FIG. 1. One memory tag 301 is associated with a picture 302, and another with a passage of text 303. Both the memory tags 301 contain additional content relevant to the printed document elements with which they are associated. Attached to the book by a holder 320 is a personal digital assistant (PDA) 310, comprising a display 312 and a digitizer pad 313 for making alphanumeric input to the PDA. The stylus 311 of the PDA for making digitizer input here has an additional function—it is also the reader (or a part of the reader, in conjunction with functionality within the PDA itself) for reading the content stored in the memory tags. All the functions of the reader described in FIGS. 1 to 3 as adapted for use in embodiments of the present invention (in essence, a reader device for reading information from an unpowered memory circuit, in this case an inductively power RFID type memory tag, attached to a printed document, the reader device comprising a circuit for providing power to the memory circuit so that data can be transmitted from a memory of the memory circuit, a decoder to read information transmitted by a transmitter of the memory circuit and a display circuit for providing information received by the decoding circuit for display) are provided by either the stylus 311 or the stylus 311 and processor of the PDA 310 in combination, according to design choice, and are not further described with reference to FIG. 7. If, as shown here, stylus 311 is not connected by a wire to PDA 310, then both stylus and PDA need to be equipped with a wire replacement communication technology such as Bluetooth—in this wireless arrangement, a power source and appropriate processing technology will need to be located within stylus 311. Content may be downloaded by bringing the stylus tip into proximity with a memory tag 301, with content then being displayed (preferably directly) on display 312 of the PDA 310. It will be appreciated that other display possibilities are possible (the PDA 310 may, for example, be adapted to control a monitor, in which case the display may take place there), but the illustrated form is considered to have the benefit that to the user, it most resembles an enhancement to the reading of a book.

As can be seen from the above a method of viewing information in a published document comprising a printed document and one or more memory circuits attached to the printed document, comprises, in one aspect of the invention, viewing information printed in the printed document, powering the memory circuit with a reader device to transmit information stored in the memory circuit to the reader device wirelessly, and displaying the information stored in the memory circuit by means of the reader device for viewing by the user. Numerous data types may advantageously be provided in the memory tags 301 using this approach. One possibility is to include a passage of video in a memory tag 301, or an animation: neither of which could be satisfactorily rendered in a static medium. Both of these applications will however place significant demands on the memory capacity of a memory tag. A further attractive possibility, likely generally to require less memory, is provision of personalisable content.

As previously suggested, a memory tag 301 may contain information that, in combination with user provided information, results in new information for display. This will typically be achieved by providing executable code in the memory tag 301 for execution by the processor of the PDA 310 (or other reading device). The user provided information may thus be information already resident in the PDA (for example, user details provided in a standard format such that the processor will obtain them when executing the executable code from a predetermined location) or information for which the user will be prompted. Here, the prompts may appear on the display 310 and responses entered by the user on display 312. Numerous examples for use of such a technology could be found. For example, a book on nutrition may contain discussion of life expectancy based on diet. The memory tag associated with this discussion may contain a questionnaire for the user: the user, on downloading the questionnaire in executable form from the memory tag, would then be prompted by the PDA display to enter answers to a series of questions about the user's diet, at the end of which the user's life expectancy would be calculated and displayed on the display 312 (possibly with tips concerning dietary improvement). This is merely an example of provision of general downloadable content in a memory tag 301 which can be used to provide information for display which is personal to the user reading the published document 300.

The memory tag technology described here generally allows users both to read from and write to memory tags 301. In the case of a mass produced document, it may be desirable to use memory tags 301 which are read-only, by disabling the writing circuit in the tag or the reader or by some other means. However, in personal or custom publication of documents, and even for some forms of mass produced document, it may be desirable to allow the user to modify or replace the content of the memory tags 301 to create a published document personalised to them.

The invention claimed is:

1. A published document comprising:
   a printed document; and
   at least one memory attached to the printed document, wherein said at least one memory comprises an electrical circuit without an integral power source that is capable of being powered wirelessly so that the electrical circuit can transmit information wirelessly, wherein a first portion of the information for display to a user is stored in the printed document and a second portion of the information for display to the user is stored in said at least one memory, and
   wherein the printed document contains a printed indication to the user of the presence of the at least one memory storing the second portion of the information.

2. A published document as claimed in claim 1, wherein said at least one memory comprises two or more memories each physically discrete from each other.

3. A published document as claimed in claim 1, wherein the second portion of the information stored in the at least one memory for display to the user comprises information for combination with user provided information to provide further information for display to the user.

4. A published document as claimed in claim 3, wherein said information for combination with user provided information comprises code for execution by a processor of a reading device.

5. A published document as claimed in claim 1, wherein the second portion of the information stored in the at least one memory for display to the user comprises information in an image format.

6. A published document as claimed in claim 1, wherein the second portion of the information stored in the at least one memory for display to the user comprises information in a video format.

7. A published document as claimed in claim 1, wherein the second portion of the information stored in the at least one memory for display to the user comprises information in a text format.

8. A published document as claimed in claim 1, wherein the at least one memory is inductively powered and transmits information at radio frequency.

9. A reader device for reading information from an unpowered memory circuit attached to a printed document, the reader device comprising:
   a. a circuit for providing power to the memory circuit so that data can be transmitted from a memory of the memory circuit;
   b. a decoder to read information transmitted by a transmitter of the memory circuit; and
   c. a display circuit for providing information received by the decoding circuit for displays,
   wherein the memory circuit comprises an electrical circuit without an integral power source that is capable of being powered wirelessly so that the electrical circuit can transmit information wirelessly, wherein a first portion of the information for display to a user is stored in the printed document and a second portion of the information for display to the user is stored in said memory of the memory circuit, wherein the printed document contains a printed indication to the user of the presence of the memory storing the second portion of the information.

10. A reader device as claimed in claim 9, wherein the circuit for providing power is adapted to power the memory circuit inductively, and wherein the decoder is adapted to receive information transmitted at radio frequency.

11. A reader device as claimed in claim 9, wherein the reader device further comprises a display.

12. A reader device as claimed in claim 11, wherein the reader device is a personal digital assistant or a handheld computer.

13. A reader device as claimed in claim 12, wherein the reader device is removably attachable to the printed document.

14. A system for viewing published information, the system comprising a published document comprising:
   a printed document; and
   at least one memory attached to the printed document, wherein said at least one memory comprises an electrical circuit without an integral power source that is capable of being powered wirelessly so that the electrical circuit can transmit information wirelessly, wherein a first portion of the information for display to a user is stored in the printed document and a second portion of the information for display to the user is stored in said at least one memory, wherein the printed document contains a printed indication to the user of the presence of the at least one memory storing the second portion of the information,
   the system further comprising a reader device for reading information from the at least one memory, the reader device comprising: a circuit for providing power to the at least one memory so that data can be transmitted from the at least one memory; a decoder to read information transmitted by a transmitter of the at least one memory; and a display circuit for providing information received by the decoding circuit for display.

15. A method of viewing information in a published document comprising a printed document and one or more memory circuits attached to the printed document, the method comprising:
   a. viewing information printed in the printed document;
   b. powering the memory circuit with a reader device to transmit information stored in the memory circuit to the reader device wirelessly; and
   c. displaying the information stored in the memory circuit by means of the reader device for viewing by a user,
   wherein the one or more memory circuits comprises an electrical circuit without an integral power source that is capable of being powered wirelessly so that the electrical circuit can transmit information wirelessly, wherein a first portion of the information for display to a user is stored in the printed document and a second portion of the information for display to the user is stored in said at least one memory, wherein the printed document contains a printed indication to the user of the presence of the at least one memory storing the second portion of the information.

16. A method of publishing a document, comprising:
   a. determining first information for viewing by a user to be printed in a printed document and second information for viewing by a user to be written to one or more memory circuits attached to the printed document;

b. printing the first information on a print medium to form the printed document; and c. writing the second information into the one or more memory circuits attached to the printed document, wherein the one or more memory circuits are adapted to be powered and read wirelessly by a reader device so that the second information can be viewed by the users, wherein the one or more memory circuits comprises an electrical circuit without an integral power source that is capable of being powered wirelessly so that the electrical circuit can transmit information wirelessly, wherein a first portion of the information for display to a user is stored in the printed document and a second portion of the information for display to the user is stored in said at least one memory, wherein the printed document contains a printed indication to the user of the presence of the at least one memory storing the second portion of the information.

17. A method as claimed in claim 16, wherein step (c) comprises fixing the one or more memory circuits to the printed document before or after writing the second information thereto.

18. A method as claimed in claim 17, wherein step (c) further comprises fixing the one or more memory circuits to the printed document in positions associated with the printing of the first information in the printed document.

19. A method as claimed in claim 16, wherein the one or more memory circuits are contained within the print medium before it is printed upon to form the printed document.

20. A method as claimed in claim 16, wherein second information is stored in one or more memory circuits in physical proximity to associated first information in the printed document.

21. A method as claimed in claim 16, wherein the printed document contains a physical indication for the user of a memory circuit containing second information.

22. A method as claimed in claim 21, wherein said physical indication corresponds to the printed indication.

23. A published document comprising a printed document and at least one memory attached to the printed document, wherein said at least one memory comprises an electrical circuit without an integral power source that is capable of being powered inductively so that the electrical circuit can transmit information wirelessly at radio frequency, wherein a first portion of the information for display to a user is stored in the printed document and a second portion of the information for display to the user is stored in said at least one memory, and wherein the printed document contains a printed indication to the user of the presence of the at least one memory storing the second portion of the information.

24. A published document comprising a printed document and at least one memory attached to the printed document, wherein said at least one memory comprises an electrical circuit without an integral power source that is capable of being powered wirelessly so that the electrical circuit can transmit information wirelessly, wherein a first portion of the information for display to a user is stored in the printed document and a second portion of the information for display to the user is stored in said at least one memory, wherein the printed document contains a printed indication to the user of the presence of the at least one memory storing the second portion of the information, and wherein the portion of the information stored in the at least one memory for display to the user comprises information for combination with user provided information to provide further information for display to the user.

* * * * *